United States Patent [19]

Kamiya

[11] Patent Number: 5,293,454
[45] Date of Patent: Mar. 8, 1994

[54] LEARNING METHOD OF NEURAL NETWORK

[75] Inventor: Shin Kamiya, Nara, Japan

[73] Assignee: Sharp Kabushiki Kaisha, Osaka, Japan

[21] Appl. No.: 761,387

[22] Filed: Sep. 18, 1991

Related U.S. Application Data

[63] Continuation-in-part of Ser. No. 480,948, Feb. 16, 1990, abandoned.

[30] Foreign Application Priority Data

Mar. 8, 1989 [JP] Japan .................................. 1-57297

[51] Int. Cl.⁵ .............................................. G06F 15/18
[52] U.S. Cl. ........................................................ 395/23
[58] Field of Search ............................................ 395/23

[56] References Cited

U.S. PATENT DOCUMENTS 4,912,649 3/1990 Wood .................................. 364/513

OTHER PUBLICATIONS

Implementing Neural Nets with Programmable Logic; IEEE Trans. on Acoustics, Speech, & Signal Processing; Jacques J. Vidal; vol. 36, No. 7, Jul. 1988; pp. 1180–1190.

An Introduction to Computing with Neural Nets; IEEE ASSP Magazine; Richard P. Lippmann; Apr. 1987; pp. 4–22.

*Primary Examiner*—Allen R. MacDonald

[57] ABSTRACT

A learning method of a neural network, in which from a set of learning patterns belonging to one category, specific learning patterns located at a region close to learning patterns belonging to another category are selected and learning of the neural network is performed by using the specific learning patterns so as to discriminate the categories from each other.

5 Claims, 3 Drawing Sheets

LEARNING METHOD OF NEURAL NETWORK

This application is a continuation-in-part of application Ser. No. 07/480,948 filed on Feb. 16, 1990 now abandoned. The entire contents of which are hereby incorporated by reference.

BACKGROUND OF THE INVENTION

The present invention generally relates to a neural network and more particularly, to a learning method of the neural network, which enables reduction of processing time for learning and prevention of excessive learning.

Recently, multilayered neural networks which learn by a learning method based on error back-propagation have been employed in fields of speech recognition, character recognition, etc. Conventionally, multilayered perceptron type neural networks have been generally used for such fields. The multilayered perceptron type neural networks are constituted by at least three layers, i.e. an input layer, an intermediate layer and an output layer.

When learning patterns and categories are input to the input layer, the above mentioned multilayered perceptron type neural network (referred to simply as a "neural network", hereinbelow) by itself learns to determine boundaries of the categories to be classified. Furthermore, in the neural network, weights of synapse connections for connecting units contained in one of the layers and units contained in the rest of the layers are automatically set and a configuration of the neural network is determined.

As a result, on the basis of the learned boundaries of the categories to be classified, this neural network which has finished learning classifies the input patterns into the categories to which the input patterns belong. At this time, the number of the units contained in the input layer is determined by the degree of the input patterns, for example, the learning patterns, while the number of the units contained in the output layer is determined by the number of the categories to be classified.

However, when a conventional neural network learns, the learning patterns are merely inputted to each unit of the input layer. Therefore, in the conventional neural network, a rather long processing time is required for learning by using a number of learning patterns, which is a great stumbling block to utilization of the neural network. Meanwhile, generally, as the large number of the inputted learning patterns is increased, accuracy of evaluation of the neural network is further improved. However, an increase in the number of the learning patterns also results in an increase in convergence of learning based on error back-propagation or causes excessive learning. Thus in the neural network which has learned by using such exceptional learning patterns, such a problem arises in that the capability for judging the categories degrades at the time of evaluation of input patterns different from the learning patterns.

SUMMARY OF THE INVENTION

Accordingly, an essential object of the present invention is to provide a learning method of a neural network, which not only can greatly reduce a learning time but can prevent excessive learning.

In order to accomplish this object of the present invention, there is provided a learning method of a neural network, according to the present invention, in which from a set of learning patterns belonging to one category, specific learning patterns located at a region close to learning patterns belonging to another category are selected and learning of the neural network is performed by using the specific learning patterns so as to discriminate the categories from each other.

BRIEF DESCRIPTION OF THE DRAWINGS

The objects and features of the present invention will become apparent from the following description taken in conjunction with the preferred embodiment thereof with reference to the accompanying drawings in which.

DETAILED DESCRIPTION OF THE INVENTION

Figure 1:
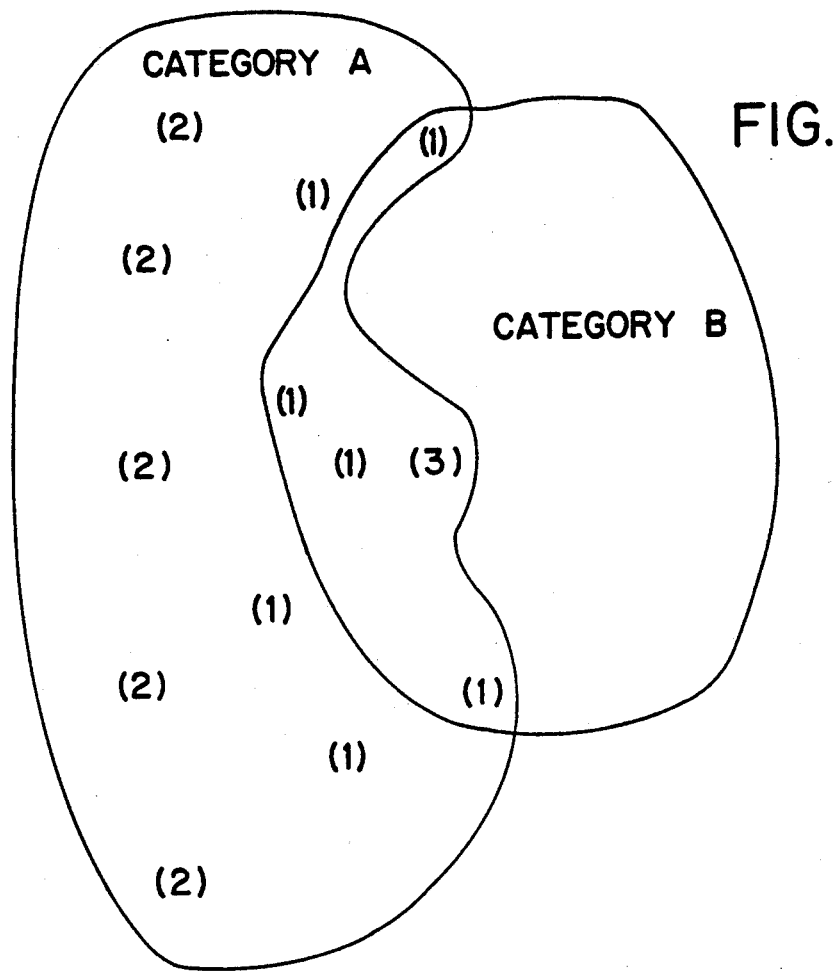
FIG. 1 is a view showing an example of distribution of learning patterns in category space in a learning method of a neural network of the present invention.

Hereinbelow, a learning method of a neural network of the present invention is described with reference to FIGS. 1 through 5. FIG. 1 shows schematically on a two-dimensional plane, an example of distribution of learning patterns of the neural network in category space. As shown in FIG. 1, learning patterns belonging to an arbitrary category, for example, category A can be classified into the following types (1), (2) and (3). The type (1) learning patterns are disposed in a predetermined region adjacent to a contour of another category, for example, category B. The type (2) learning patterns are disposed in the vicinity of a center of the arbitrary category, i.e. category (category A) but in another category (category B). The type (3) learning patterns are exceptional learning patterns or defective learning patterns.

In FIG. 1, symbol "(1)" represents position of each of the type (1) learning patterns in category space and symbol "(2)" represents position of each of the type (2) learning patterns in category space. Meanwhile, symbol "(3)" represents position of each of the type (3) learning patterns in category space.

Figure 2:
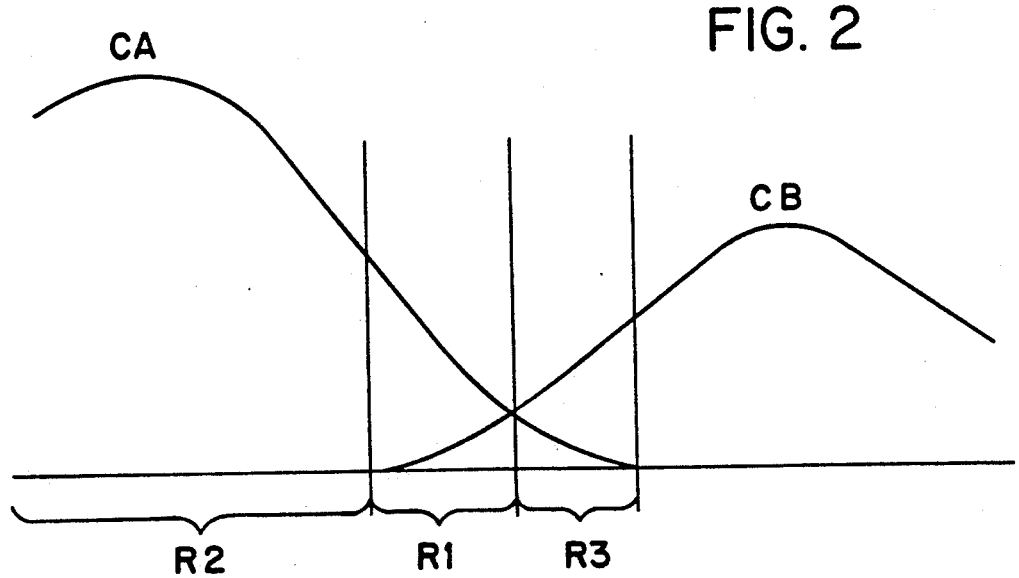
FIG. 2 is a view showing an example of frequency curves regarding presence of the learning patterns of FIG. 1 in each of the categories.

FIG. 2 schematically shows frequency curves regarding presence of the learning patterns of FIG. 1 in each of categories A and B. In FIG. 2, character CA denotes a frequency curve indicative of presence of the learning patterns in category A, while character CB denotes a frequency curve indicative of presence of the learning patterns in category B. From FIG. 2, the above three types (1) to (3) learning patterns can also be expressed as follows. The type (1) learning patterns are learning patterns which are present in a region located in another category (category B) with a certain frequency. The type (2) learning patterns are learning patterns present in a region which not only is located in the arbitrary category (category A) with a higher frequency than that of another category (category B) but contains no type (1) learning patterns which are located in another category (category B) with a higher frequency than that of the arbitrary category (category A).

In FIG. 2, characters R1 denotes a region in which the type (1) learning pattern are disposed, while character R2 denotes a region in which the type (2) learning patterns are disposed. Meanwhile, character R3 denotes a region in which the type (3) learning patterns are disposed. One example of the type (3) learning patterns is as follows. Namely, in recognition of syllables, such a case arises in which a characteristic pattern (namely, a learning pattern) of, for example, a syllable "pa" uttered by a specific speaker is disposed in a category of a syllable "ba" uttered by another speaker due to difference in utterance between the two speakers, connection of articulation, etc. In this case, although this learning pattern belongs to the category "pa", a probability that the learning pattern belongs to the category "ba" is higher than a probability that the learning pattern belongs to the category "pa".

In evaluation by the neural network, the boundaries of the above categories, which were obtained by learning, are used for outputting the categories to which the inputted patterns belong. Therefore, it is essential that the learning patterns used for learning of the neural network should be the type (1) learning patterns. Namely, the type (2) learning patterns are disposed adjacent to the central portion of category A and thus, do not greatly contribute to learning of the neural network, which is performed for obtaining the boundaries of the categories, thereby resulting in extreme increase of learning time. Meanwhile, since the type (3) learning patterns are exceptional patterns or defective patterns, learning based on the type (3) learning patterns becomes learning regarding exceptional or improper examples, i.e. excessive learning. Hence, learning based on the type (3) learning patterns increases learning time extremely and degrades classification performance at the time of evaluation.

In the present invention, in learning of the neural network, groups of the learning patterns are preliminarily classified into the above mentioned types and as a result of this classification, only the type (1) learning patterns, i.e. only the learning patterns effective for learning are employed such that efficient learning of the neural network is performed.

Figure 3:
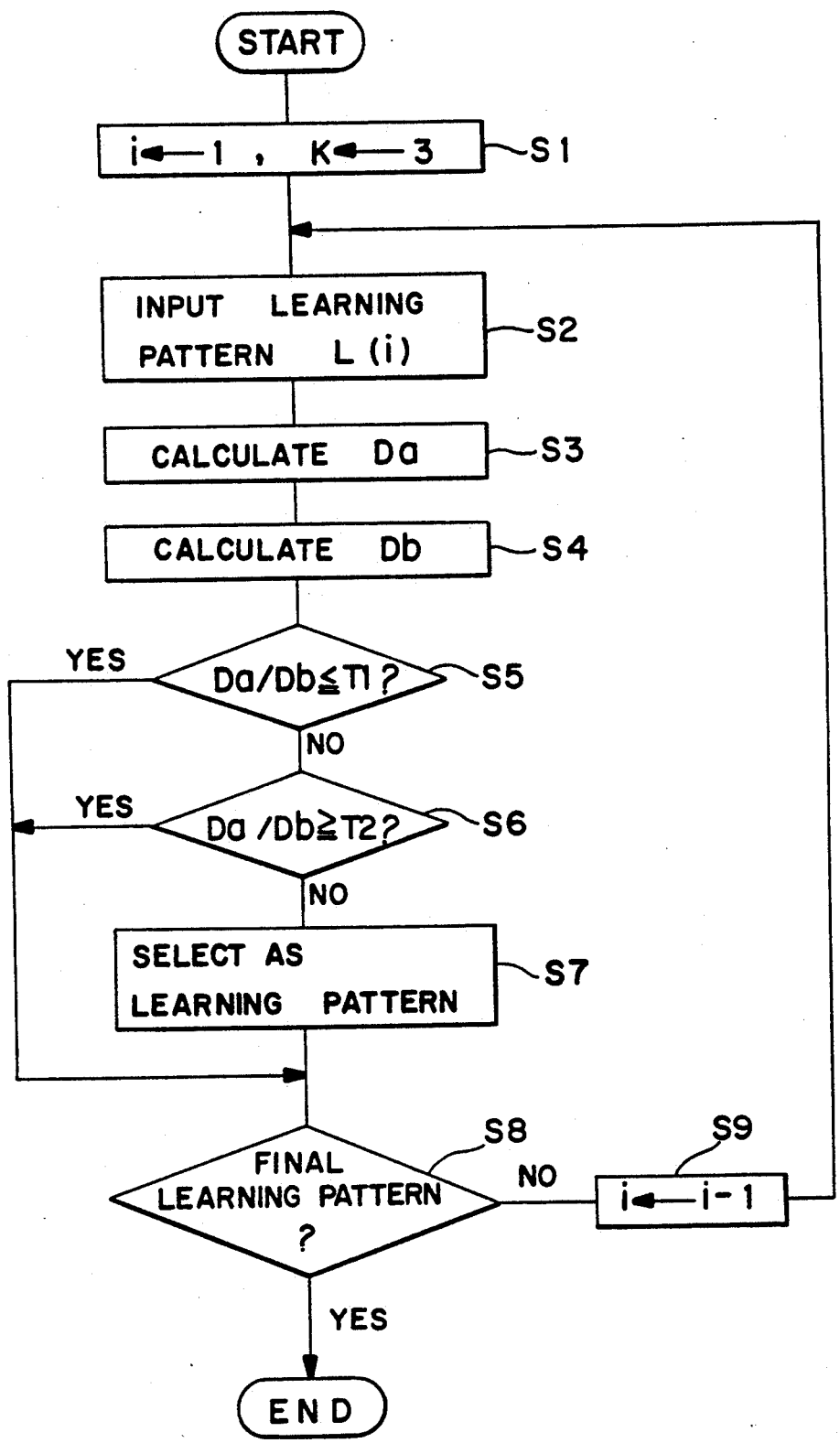
FIG. 3 is a flowchart illustrating the selection method of the present application.

There are various methods for classifying the learning patterns into the types. In this embodiment, as shown in FIG. 3, the K-nearest-neighbor method is employed. Hereinbelow, classification of the learning patterns into types by the K-nearest-neighbor method is described in detail on the assumption that the number of the categories are two, namely, the categories is constituted by the categories A and B. Initially, in step S2, one target learning pattern for classification is picked up from the groups of the learning patterns belonging to category A and K learning patterns are selected, in increasing order of distance from the target learning pattern, from the learning patterns belonging to category A. Then, in step S4, an average distance Da between the K selected learning patterns of the category A and the target patterns are selected, in increasing order of distance from the target learning patter, from the learning patterns belonging to the category B. Then, an average distance Db between the K selected learning patterns of the category B and the target learning pattern is calculated. Thereafter, the target learning pattern is classified into one of the types (1), (2) and (3) by comparing the average distances Da and Db as described below. Namely, ratio of the average distance Da to the average distance Db is calculated and the target learning pattern is classified into one of the types (1), (2) and (3) according to the ratio of the average distance Da to the average distance Db as follows. If the relation: T1<Da/Db<T2 is obtained on the supposition that characters T1 and T2 are threshold values satisfying the relation: T1<1<T2 (Steps S5-S7), the target learning pattern is classified into type (1). If the relation: Da/Db≦T1 is obtained, target learning pattern is classified into type (2). Meanwhile, if the relation: T2≦Da/Db is obtained, the target learning pattern is classified into type (3). Likewise, the remaining target learning patterns belonging to category A are classified into the types (1), (2) and (3).

Subsequently, in the same manner as described above, one target learning pattern for classification is picked up from the learning patterns belonging to category B and K learning patterns are selected, in increasing order of distance from the target learning pattern, from the learning patterns belonging to the category B. Then, an average distance Db' between the target learning pattern and the K learning patterns of category B is calculated. Thereafter, K learning patterns are selected, in increasing order of distance from the target learning pattern, from the learning patterns belonging to category A. Thus an average distance Da' between the target learning pattern and the K learning patterns of category A is calculated. Then, the target learning pattern of category B is classified into one of the types (1), (2) or (3) based on the ratio of the average distance Db' to the average distance Da' and the threshold values T1 and T2 referred to above. Similarly, the remaining target learning patterns belonging to category B are classified into the types (1), (2) or (3).

Among the learning patterns classified into types (1), (2) and (3) as described above, the learning patterns classified in type (1) and belonging to category A and the learning patterns classified into type (1) and belonging to the category B are used for learning of the neural network, whereby the neural network is capable of learning the boundary of categories A and B efficiently.

Figure 4:
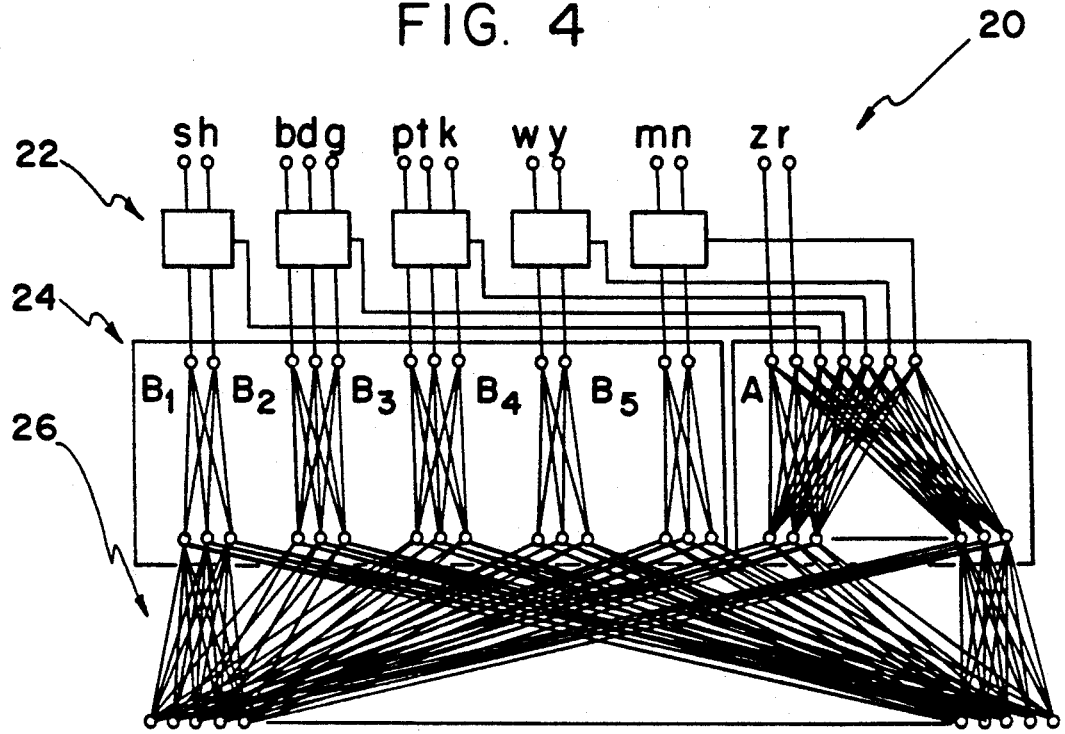
FIG. 4 is a diagram of an exemplary group divisional type neural network of the type used in the preferred embodiment.
Figure 5:
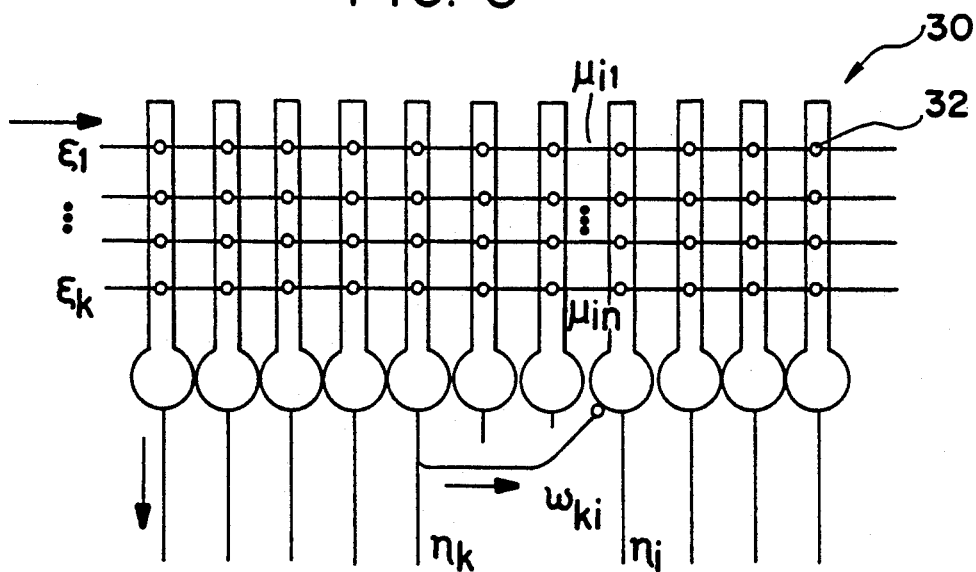
FIG. 5 is a diagram of an exemplary Kohonen feature map neural network of the type used in an alternate preferred embodiment.

FIG. 4 illustrates a three-layered group divisional type neural network 20 of the type used in the preferred embodiment with an input layer 22 of 32 units, an intermediate layer 24 of three units and an output layer 26 of five units. FIG. 5 illustrates a Kohonen feature map neural network 30 with neurons 32 arranged in a two-dimensional plane such that:

$$\eta_i = \sigma\left[\sum_{i=1}^{n} \mu_{ij}\epsilon_j\right]$$

Table 1 below shows results of decision on boundaries of syllables by the use of the neural network in which learning has been performed as described above.

TABLE 1

|  | Prior Art | Present Invention |
|---|---|---|
| Error rate (%) | 12.6 | 11.8 |
| Learning time ratio | 100 | 29.5 |

In this learning, 1,019 data consisting of powers and spectral changes of three speakers are employed as learning data. Furthermore, 1,708 data consisting of powers and spectral changes of four other speakers obtained from different contexts are employed as evaluation data. In the method of the present invention of Table 1, the learning data are classified into types by the K-nearest-neighbor method referred to above. In this embodiment, the parameters K, T1 and T2 are, respectively, set to 3, 0.77 and 1.1 and Euclidean distance is employed as distance. Meanwhile, the 1,019 learning data are classified into 29.5% of the type (1) 65.0% of the type (2) and 5.5% of the type (3). Thus, 301 type (1) data are obtained from the 1,019 learning data.

On the other hand, in the prior art method of Table 1, learning is performed by using the 1,019 learning data as a whole.

In Table 1, error rate indicates rate of error in decision on boundaries of syllables by %, while learning time ratio is expressed by setting learning time of the prior art method to 100. Table 1 reveals that learning time ratio of the method of the present invention is reduced by as much as 70% as compared with the prior art method, thereby resulting in substantial reduction of learning time. This is because only the 01 type (1) learning data effective for learning of the boundaries of the categories are strictly selected from the 1,019 learning data by the K-nearest-neighbor method such that learning of the neural network is performed by only this small number of type (1) learning data.

Meanwhile, in the present invention, since learning is performed by only the learning data effective for learning of the boundaries of the categories, it was found that excessive learning is prevented and error rate drops under open conditions in comparison with the prior art method.

As described above, in the method of the present invention, only the learning patterns located at the predetermined region close to the contour of category B, i.e. only type (1) learning patterns belonging to the category A as a preprocessing of learning of the neural network such that learning of the neural network is performed by using the selected patterns. Accordingly learning time of the neural network can be reduced greatly by using the small number of the learning patterns. Further more, since only the learning patterns most effective for learning the boundaries of the categories are selected from all the learning patterns so as to be used for learning, excessive learning can be prevented and capability for judging the categories can be improved.

In the above embodiment, the degree of the learning patterns is 18 (powers and spectral changes of 9 frames) and the number of the categories is 2. it is needless to say that the present invention is not limited to this case.

In the above embodiment, Euclidean distance is used as distance between the learning patterns. However, the present invention is not limited to this procedure. For example, city block distance may also be used in place of Euclidean distance.

Furthermore, in the above embodiment, the K-nearest-neighbor method is employed s a classification method. However, the present invention is not limited to the K-nearest-neighbor method but may also employ a discriminating function, a composite similarity degree or the like in place of the K-nearest-neighbor method.

Moreover, in the learning method of the neural network of the present invention, great effects can be achieved in learning of not only the multilayered perceptron type neural network but the kohonen type neural network.

As will be seen from the foregoing description, in the learning method of the neural network of the present invention, from a set of the learning patterns belonging to one category, the learning patterns located at the region close to the learning patterns belonging to another category are selected so as to be used for learning of the neural network. Therefore, learning of the neural network can be performed by the small number of learning patterns and learning time of the neural network can be reduced substantially.

Meanwhile, in the learning method of the neural network of the present invention, since only the learning patterns most effective for learning the boundaries of the categories are selected so as to be used for learning of the neural network, excessive learning can be prevented and capability for classifying the input patterns into the categories can be improved.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

We claim:

1. A method of selecting specific learning patterns from learning patterns utilized in a neural network for speech recognition or character recognition, by classifying learning patterns into types by the K (where K is an integer $>0$) nearest neighbor method, comprising the steps of:
    (a) dividing the learning patterns into two categories;
    (b) selecting a first target learning pattern from the learning patterns of a first category;
    (c) selecting K learning patterns from the learning patterns of the first category in increasing order of distance from the first target learning pattern;
    (d) calculating an average Euclidean distance between the K learning patterns and the first target learning pattern for the first category;
    (e) repeating steps (c)–(d) replacing the first category with a second category;
    (f) comparing a ratio of the average Euclidean distances of the K learning patterns of the first and second categories with a first predetermined threshold $T_1$ which is less than 1, and a second predetermined threshold, $T_2$, which is greater than 1;
    (g) classifying the first target learning pattern as type (1) if the ratio of the average Euclidean distances of the K learning patterns of the first and second categories is between $T_1$ and $T_2$;
    (h) selecting the first target learning pattern from the first category for utilization in the neural network for speech recognition or character recognition if it is type (1);
    (i) selecting a second target learning pattern from the learning patterns of the second category;
    (j) repeating steps (c)–(g) replacing the first target learning pattern with the second target learning pattern; and
    (k) selecting the second target learning pattern from the second category for utilization in the neural network for speech recognition or character recognition if it is type (1).

2. The method of selecting specific learning patterns of claim 1, wherein learning patterns are classified into types using a discriminating function.

3. The method of selecting specific learning patterns of claim 1, wherein steps (d) and (f) are performed using an average city block distance calculation.

4. The method of selecting specific learning patterns of claim 1, wherein the neural network is multilayered perception type neural network.

5. The method of selecting specific learning patterns of claim 1, wherein the neural network is a Kohonen type neural network.

* * * * *